United States Patent [19]

Beecher

[11] Patent Number: 5,033,084
[45] Date of Patent: Jul. 16, 1991

[54] METHOD AND APPARATUS FOR PROTECTION OF SOFTWARE IN AN ELECTRONIC SYSTEM

[75] Inventor: David A. Beecher, Kirkland, Wash.
[73] Assignee: Data I/O Corporation, Redmond, Wash.
[21] Appl. No.: 503,192
[22] Filed: Apr. 2, 1990
[51] Int. Cl.[5] .............................................. H01L 9/00
[52] U.S. Cl. .......................................... 380/4; 380/25
[58] Field of Search ...................................... 380/4, 25
[56] References Cited

U.S. PATENT DOCUMENTS

| | | | |
|---|---|---|---|
| 4,609,777 | 9/1986 | Cargile | 380/4 |
| 4,740,890 | 4/1988 | William | 380/4 |
| 4,791,565 | 12/1988 | Dunham et al. | 380/4 |
| 4,817,140 | 3/1989 | Chandra et al. | 380/4 |
| 4,866,769 | 9/1989 | Karp | 380/4 |
| 4,903,296 | 2/1990 | Chandra et al. | 380/4 |

Primary Examiner—Thomas H. Tarcza
Assistant Examiner—David Cain
Attorney, Agent, or Firm—Seed and Berry

[57] ABSTRACT

A method and apparatus for protecting software used in an electronic system. An electronic key is associated with the software, which is at least partially unreadable unless modified. The electronic system using the software to be protected receives the electronic key, and reads the software to determine that the electronic key and software are associated. The system then modifies the software to render it readable and identifies the software with the electronic system by storing an identifier of the system with the software. Finally, the system modifies the electronic key to render it useless.

17 Claims, 6 Drawing Sheets

METHOD AND APPARATUS FOR PROTECTION OF SOFTWARE IN AN ELECTRONIC SYSTEM

DESCRIPTION

1. Field of the Invention

The present invention relates to software security, and more particularly, to a method and apparatus for protection of software in an electronic system.

2. Background Art

Many present-day electronic systems use software to control transfers of data and program instructions. The software can be embodied in many forms, ranging from removable read-only memory (ROM), through diskettes, to hard drive disk systems. In some software-based electronic systems, it is important to prevent unauthorized copying of the software. There is a particular need to protect software that is updated from time to time.

In one particular example, given for illustrative purposes only, an electronic system for programming programmable logical devices (PLDs) typically uses software including PLD specification data and programming algorithms recorded on diskettes. The user of such a PLD programming system typically subscribes to an update service which periodically supplies new software including data describing new PLDs and the programming algorithms to test the PLDs. It is desirable to prevent unauthorized copying of the updated software due to the great expense of producing the software.

On the other hand, it is a generally accepted practice for software developers to permit an authorized user to make a copy of the software. This allows the user to retain an archived copy in case the primarily used copy somehow becomes inoperable. This practice avoids the inconvenience and delay to the user that would result if the user had to order a new copy of the software from the software's developer.

There have been previous attempts to protect software designed to be used with electronic systems. In one such attempt, each copy of the software originally contains a number that indicates that the software has never been used. All versions of a particular issue of the software contain the same number. Each copy of the software is permanently associated with a particular electronic system at the time that the software is first used. This is accomplished by transferring a unique serial number for the particular electronic system to the diskette or other medium storing the software. This forever identifies that copy of the software with the particular electronic system. If an attempt were made to use the copy of the software with a second electronic system having a different identifying number, the software detects the difference between the system identification number recorded on the software and the system identification number of the second system. However, the success of this method depends upon maintaining the security of copies of the software before they have been identified with a particular electronic system. Otherwise, copies of the software can be made before the software has been identified with a particular system, and these copies can then be identified with an electronic system without fear that the copying will be detected.

A second software protection system requires both a copy of the software and an associated random access memory (RAM). The RAM, which is packaged with a battery to supply electrical power, is adapted for connection to the electronic system. However, the RAMs are susceptible to damage from voltage spikes relating to improper handling or to insertion into an improper port of the electronic system. The particular copies of the software and RAM contain security codes that render the software inoperable unless the corresponding RAM is also attached to the electronic system. Such security systems are also inconvenient because they require the user to connect the RAM to the electronic system as well as the corresponding copy of the software.

A third protection scheme requires the software to be recorded on a specially prepared diskette that contains data recorded in a special form on a "half track" located between the normal positions of two adjacent diskette tracks. The special diskette contains instructions for reading data from the diskette (including the half track data), recording the data to a hard drive in the electronic system, and erasing the half track on the original diskette. An unauthorized copier of such a diskette is generally unaware of the location (or even the existence) of the half track data and, accordingly, is unable to make a complete copy of the software. This systems also assures that the data will be used only with the electronic system containing the hard disk. Unfortunately, inadvertent loss of the data recorded on the hard disk would require that an authorized user will have to get a new diskette, causing the user inconvenience.

SUMMARY OF THE INVENTION

It is an object of the present invention to provide a method and apparatus for protecting storage media used by an electronic system.

It is another object of the present invention to provide a method and apparatus for programming an integrated circuit with data according to a private algorithm.

It is a further object of the present invention to provide a method and apparatus for identifying software contained on a storage medium with an authorized electronic system in a form that cannot be used with an unauthorized electronic system.

It is a still further object of the present invention to provide a method and apparatus for securing storage media to an authorized electronic system with an electronic key that can be used only one time.

According to one aspect, the invention is an apparatus for protecting storage media used by an electronic system. The apparatus includes means for storing an indicator that is distinctive for the electronic system, means for reading from readable storage media, and means for reading an electronic key. The apparatus further includes an electronic key, including electronic elements and having inputs and outputs connected to the electronic elements. The electronic elements are programmed according to a modifiable fusemap. The electronic key produces predetermined response levels at its outputs in response to predetermined levels at its inputs in accordance with the fusemap.

The apparatus also includes modifiable storage media associated with the electronic key. At least a portion of the storage media is unreadable by the storage media reading means, if an indicator in the storage media is not a predetermined function of the indicator that is distinctive for the electronic system. The apparatus also includes means for applying a predetermined set of test levels to the inputs of the electronic key, and for receiving the corresponding output levels, means for comparing the output levels to a predetermined set of response levels, and means for signifying that the output levels are properly matched with the response levels. Also, the apparatus includes means for transferring the distinctive indicator from the electronic systems to the storage media, thereby identifying the storage media with the electronic system, and means for modifying the fusemap.

In another aspect, the invention includes a method for protecting storage media used by an electronic system. The method comprises the steps of storing an indicator that is distinctive for the electronic system, providing means for reading from readable storage media, providing means for reading an electronic key, and providing a modifiable electronic key having inputs and outputs.

The method further comprises providing modifiable storage media associated with the electronic key. At least a portion of the storage media is unreadable by the storage media reading means if an indicator in the storage media is not a predetermined function of the indicator that is distinctive for the electronic system. The method also comprises the step of reading the electronic key by applying a predetermined set of test levels to the inputs of the electronic key and receiving the corresponding output levels of the electronic key, comparing the output levels of the electronic key to a predetermined set of response levels.

The method additionally comprises the steps of signifying when the output levels are properly matched with the predetermined set of response levels, transferring the distinctive indicator from the electronic system to the storage media, thereby identifying the storage media with the electronic system, when the output levels are properly matched with the predetermined set of response levels, and modifying the electronic key.

BEST MODES FOR CARRYING OUT THE INVENTION

Figure 1:
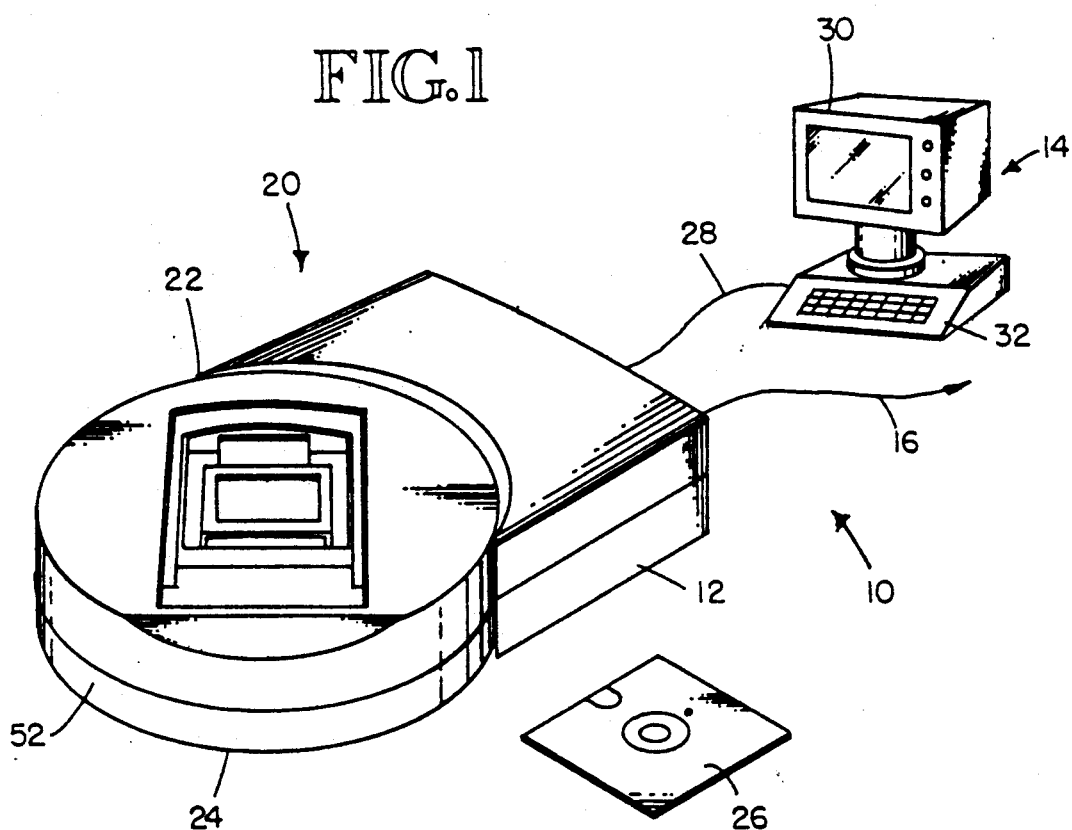
FIG. 1 is a schematic drawing of an electronic system for programming PLDs.

FIG. 1 is a schematic diagram of an electronic system 10 that can be used with the method and apparatus of the present invention. While the electronic system 10 depicted in FIG. 1 is intended for programming PLDs, it will be appreciated by those skilled in the art that the electronic system 10 can be any system that receives data from a storage medium that can be copied. Examples of such electronic systems 10 include personal computers (PCs) and video entertainment game systems. Accordingly, the PLD programming system is chosen for exemplary purposes only, and that the invention is not limited thereto.

The electronic system 10 includes a PLD programmer 12 which is connected to a terminal 14. The PLD programmer 12 can also be connected to a host computer (not shown) through a cable 16. The PLD programmer 12 includes a housing 20 which includes a PLD alignment mechanism 22 and a diskette drive 24. An electrical contact means (not shown in FIG. 1) is located below the PLD alignment mechanism 22. The diskette drive 24 is capable of reading from and writing to a diskette 26. The diskette 26 serves as a storage medium for data necessary to program a PLD.

The data stored on the diskette 26 includes system-related data and algorithm-related data. The system-related data includes instructions to initialize the system, to cause data to transfer within the system, and to control a display 30 and a keyboard 32 that are part of the terminal 14. The algorithm-related data include descriptions of the various PLDs that can be programmed by the PLD programmer 12. The descriptions relate both to the families of the PLDs that can be programmed by the PLD programmer 12, and the pin structures of the PLDs that can be programmed by the PLD programmer 12. The algorithm-related data also include algorithms for using the system-related data to produce appropriate signals for programming a PLD belonging to a particular PLD family and having a particular pin structure. A portion of the medium carrying the algorithm-related data is not written to, in order to render it inoperable until it has been associated with a particular installation of the electronic system 10. The system-related data cannot be modified since it is necessary to cause the system to run. The data stored on the diskette 26 also includes authenticating data that, as explained below, corresponds to information in an electronic key.

The system- and algorithm-related data, including the PLD family and PLD pin structure information, are described in co-pending U.S. patent application Ser. No. 07/453,225, filed Dec. 14, 1989, which is a continuation of U.S. patent application Ser. No. 07/067,646, filed June 26, 1987, now abandoned. The above-described co-pending patent application is assigned to the assignee of the present application.

In an alternative embodiment, the diskette 26 can be replaced by another storage medium, such as a read-only memory (ROM), and diskette drive 24 can be replaced by means for reading from the storage medium, such as a socket for receiving the ROM.

The terminal 14 is connected to the PLD programmer 12 through a bi-directional cable 28. The terminal 14 can receive information from the PLD programmer 12 through the cable 28 for display on display device 30. The keyboard 32 of the terminal 14 can be used to issue instructions to the PLD programmer 12 through the cable 28. The instructions can be simultaneously displayed on the display device 30.

Figure 2:
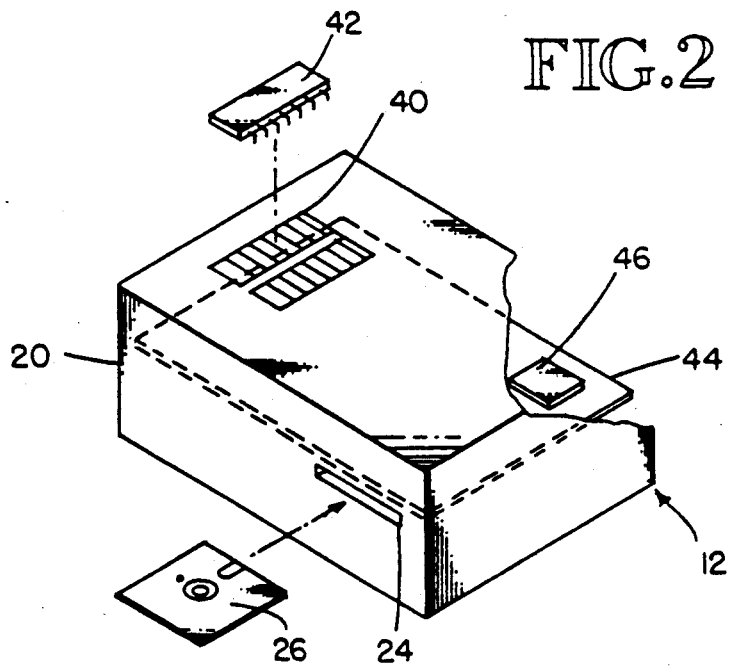
FIG. 2 is a schematic cutaway diagram of the PLD programmer in the electronic system of FIG. 1.

FIG. 2 is a schematic cut-away diagram of the PLD programmer 12 in the electronic system of FIG. 1. The PLD alignment mechanism 22 is removed for clarity. The PLD programmer 12 includes a contact means 40 adapted to receive and make an electrical connection with an electronic key 42, which can be a PLD containing information in the form of a predetermined fusemap that determines the logic functions of the PLD. The information contained in the key 42 corresponds to authenticating data stored on the diskette 26. The diskette 26 and key 42 are preferably shipped to the use together, although they may be shipped separately for even greater security. In the event that the key 42 is a PLD, containing a programmable fusemap, a safety fuse commonly formed in the PLD is preferable blown prior to shipping so that the fusemap cannot be determined after shipping. As a result, it is not possible to make unauthorized copies of the key 42. The key 42 may also be other types of devices, such as errasable or modifiable optical or magnetically encoded devices, or potted electronic circuits that perform functions that can be electronically altered.

The contact means 40 can be a socket, as shown in FIG. 2, or other means for connecting to the electronic key 42. The PLD programmer 12 includes a circuit board 44 upon which is mounted an electronic component 46, such as a ROM. The electronic component 46 stores an indicator that is distinctive for the particular electronic system 10, of which the PLD programmer 12 is a part. One example of such an indicator is a unique serial number. The indicator stored in the electronic component 46 can be read electronically so that the indicator can be used in labeling the data stored on the diskette 26.

Before the software has been permanently associated with a particular installation of the system 10, the software is inoperable because a portion of the algorithm-related data has been scrambled. The software cannot be installed on any system 10 unless the copy of its associated electronic key 42 has been electrically connected to the system 10. The system-related software causes the electronic key 42 to be tested electronically, to assure that it is matched to the software. After this has been accomplished, the algorithm-related portion of the software is unscrambled and copied into the software. The indicator of the particular installation of the system 10 is also copied into the software. Finally, the electronic key 42 is modified electronically, rendering it of no further use.

Figure 3:
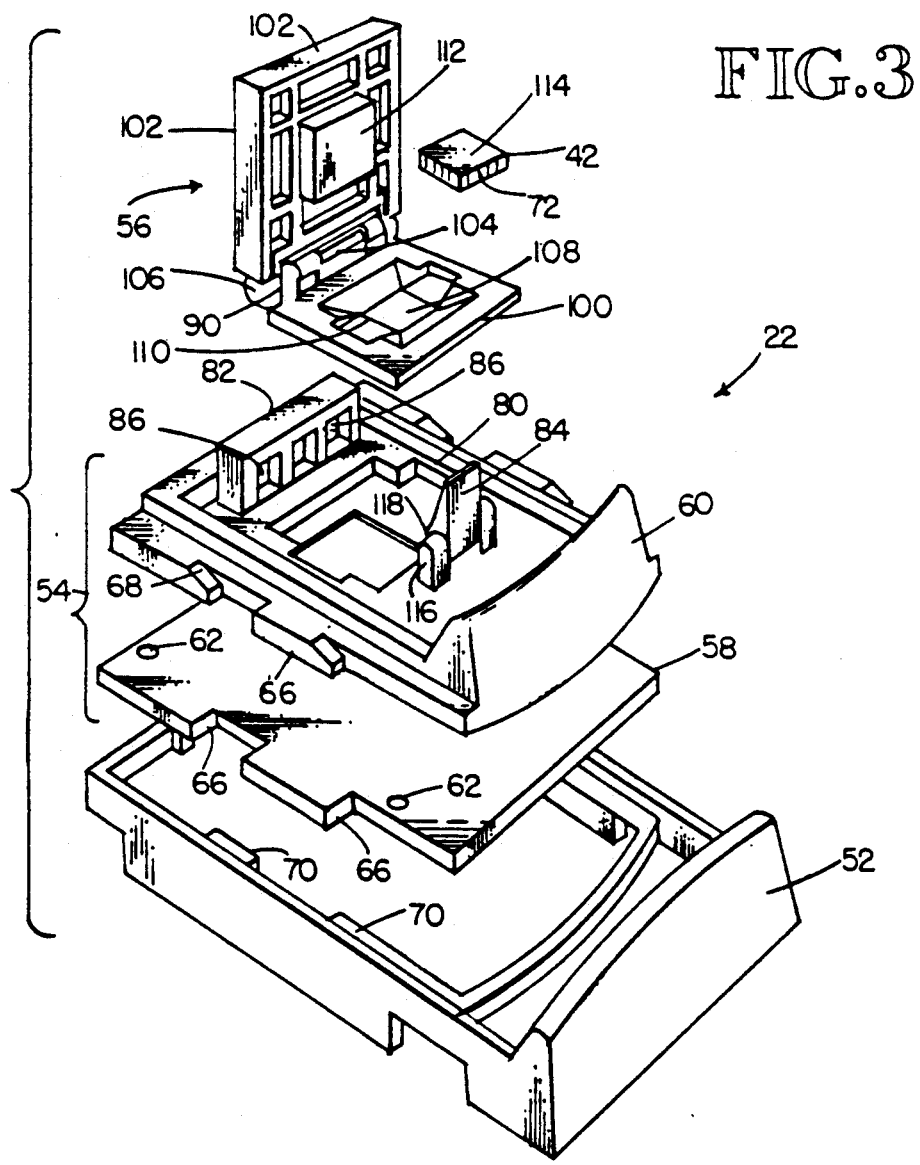
FIG. 3 is an isometric exploded view of an alignment mechanism used in the PLD programmer shown in FIG. 1.

FIG. 3 is an isometric exploded view of a PLD alignment mechanism used in the PLD programmer shown in FIG. 1. The PLD alignment mechanism 22 includes a handle 52, a base 54, and a "matchbook" 56. The handle 52 engages the housing 20 so that the PLD alignment mechanism 22 can be disengaged from the housing 20 when the handle 52 is moved radially outward from the housing 20 (see FIG. 1).

The base 54 includes a device under test (DUT) board 58 and a compression ring 60. The DUT board 58 and the compression ring 60 are detachably engaged by means of the holes 62 in the DUT board 58 and the projections 64 in the compression ring 60. The DUT board 58 and the compression ring 60 respectively have projecting tabs 66 which are vertically aligned when the DUT board 58 and the compression ring 60 are engaged. The tabs 66 on the compression ring 60 include ramped surfaces 68 that are depressed by tabs 70 on the handle 52 when the handle 52 is pressed radially inward toward the housing 20. This forces the compression ring 60 onto the DUT board 58, ensuring good electrical contact between the pins 72 of the electronic key 42 and electrical contact means on the DUT board 58.

The DUT board 58 and the compression ring 60 can be separated from one another so that another DUT board can be assembled into the base 54, in case a different form of electronic key 42 is to be programmed. At present, the commerically significant forms of the electronic key 42 are leadless chip carriers (LCCs), including plastic LCCs (PLCCs), small outline integrated circuits (SOICs), and quad flat packs (QFPs). The PLD alignment mechanism 22 can be adapted to provide a base 54 for any one of these three forms of electronic key 42. The electronic key 42 shown in FIG. 3 is an LCC.

The compression ring 60 includes an aperture 80 which defines an area on the surface of the DUT board 58 when the DUT board 58 and the compression ring 60 are engaged. The defined area on the DUT board 58 includes electrical contact means, including electrical traces, and a conductive sheet for electrically connecting the pins 72 of the electronic key 42 to the electrical traces on the DUT board 58. The compression ring 60 also includes an upward projection 82 and a latch mechanism 84. The projection 82 includes downwardly-facing horizontal surfaces 86 that engage with tabs 90 (see FIGS. 3 and 4) projecting rearwardly from the matchbook 56.

The matchbook 56 includes lower part 100 and upper part 102. The upper and lower parts 100 and 102 are hinged together at the rearward edges through a hinge 104 including a hinge pin 106. The lower part 100 includes an aperture 108 having an outline defined by the perimeter 110. The perimeter 110 matches the configuration of a suitable electronic key 42. The aperture 108 defines a sub-area within the area on the DUT board 58 defined by the aperture 80 in the compression ring 60.

The upper part 102 includes a tensioning means 112, such as a piece of resilient foam having an outline similar to the outline of the upper surface 114 of the electronic key 42. For other PLDs 42, the tensioning means 112 can take the form of a series of non-resilient projections (not shown) which suitably force downwardly against the upper surface 114 of the electronic key 42 when the upper part 102 of the matchbook 56 is hinged against the lower part 100.

In use, the PLD alignment mechanism 22 forces the electronic key 42 into electrical contact against the electrical traces formed in the DUT board 58, so that appropriate electrical signals can be imposed on or received from the pins 72 of the electronic key 42 by the PLD programmer 12. An appropriate matchbook 56 is chosen to enclose the electronic key 42 by closing the upper part 102 against the lower part 100. The then-closed matchbook 56 is engaged with the compression ring 60 by first placing the tabs 90 into the projection 82 so that they bear against the horizontal surfaces 86. Then the forward edges of the lower and upper parts 100 and 102 are pressed downwardly past the latch mechanism 84 which is hinged by means of hinge 116 to engage an upper surface of the upper part 102 under a projecting surface 118 on the latch mechanism 84. By suitably tolerancing the dimensions of the apertures 108 and 80 with respect to the spacings between the pins 72 and between the electrical traces in the DUT board 58, the electronic key 42 can be brought into electrical contact with the traces on the DUT board 58 with a high degree of reliability.

Figure 4:
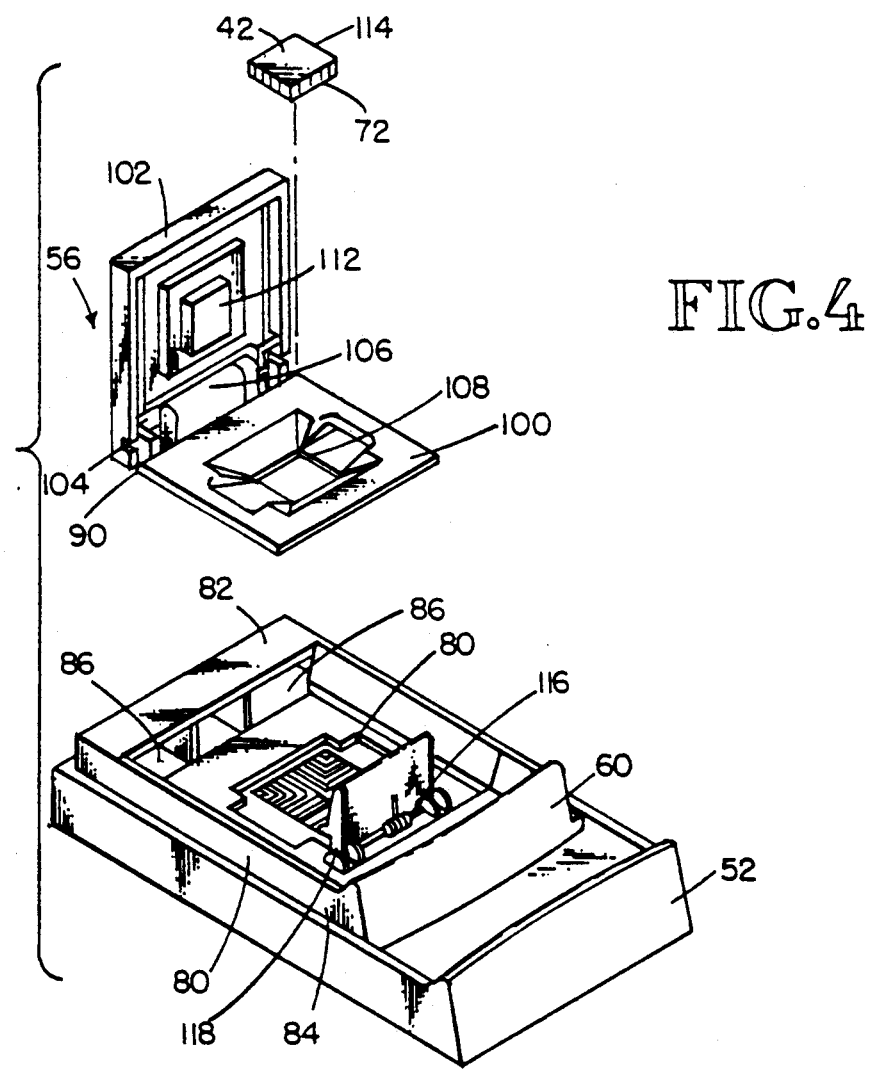
FIG. 4 is a close-up, exploded isometric view of a portion of the alignment mechanism shown in FIG. 3.

FIG. 4 is a close-up, exploded isometric view of a portion of the alignment mechanism shown in FIG. 3. The DUT board 58 includes a printed circuit (PC) board 130 and a conductive pad 132. An upper surface 134 of the PC board 130 includes an array of electrical traces 136 which are organized and oriented to accommodate the pins 72 of a variety of differently-sized PLDs 42 belonging to a given PLD family. The aperture 80 (see FIG. 3) in the compression ring 60 defines an area outlined by the perimeter 138. The aperture 108 in the lower part 102 (see FIG. 3) defines an inner area within an inner perimeter 140. The alignment of the matchbook 56 within the compression ring 60 causes precise electrical contact between the pins 72 of the electronic key 42 and the electrical traces 136 on the upper surface 134 of the PC board 130.

Figure 5:
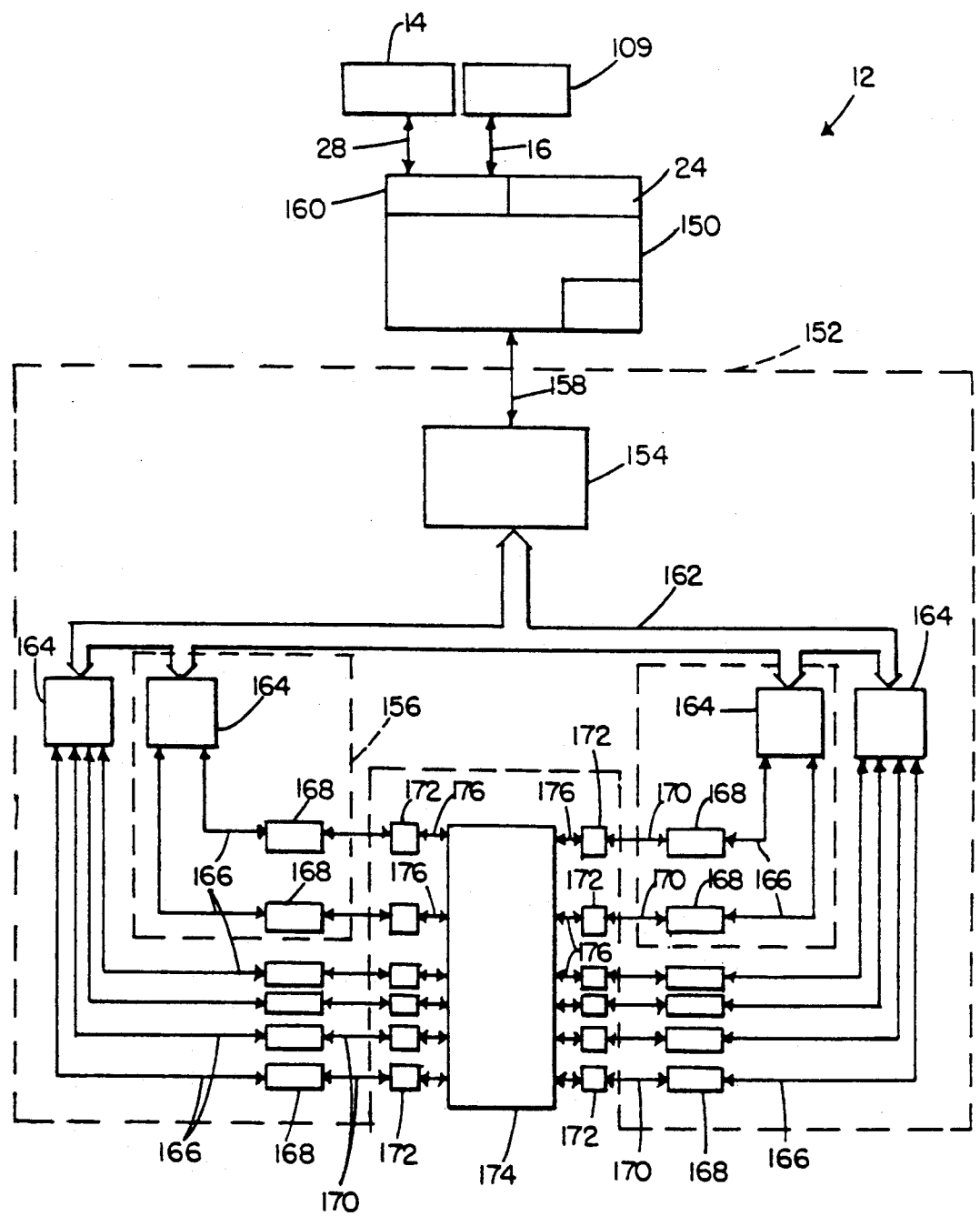
FIG. 5 is a schematic diagram of the architecture of the PLD programmer in the electronic system shown in FIG. 1.

FIG. 5 is a schematic diagram of the architecture of the PLD programmer in the electronic system shown in FIG. 1. The PLD programmer is described in greater detail in the above-mentioned U.S. patent application Ser. No. 07/453,225 and is commercially available in the "UNISITE 40" Programmer sold by Data I/O of Redmond, Wash. This architecture includes a system processor 150, which may be a Motorola model 68,000 microprocessor. The PLD programmer 12 further comprises a programming processor 152, which contains a pin control unit 154 connected to a plurality of pin-logic integrated circuits (ICs) 156. In the preferred embodiment, pin-logic IC 156 can be a CMOS gate array having 3200 gates with 2-micron double-metal traces in a 68-pin PLCC package. System processor 150 and programming processor 152 communicate via a bi-directional bus 158. External communications with system processor 150 are accomplished between the terminal 14 as well as a host computer 159 through I/O ports 160, which can, for example, operate according to the RS 232C protocol.

Pin-control unit 154 communicates with each copy of pin-logic IC 156 by means of a bi-directional digital programming-control interface 162. Programming-control interface 162 can, in the preferred embodiment, consist of twenty various instruction, control, and datapath lines.

Pin-logic IC 156 contains instruction-code and datapath control device 164, which, in turn, is connected through bi-directional lines 166 to four copies of pin-logic block (PLB) 168. Pin-logic IC 156 can be mounted on the circuit board 40 (see FIG. 2), along with associated power-supply and signal-conditioning circuitry.

The pin-logic blocks 168 are connected by bi-directional line 170 to copies of pin driver 172. In general, the pin drivers 172 can be digital or analog devices, although most typically, they generate analog signals. Each copy of pin driver 172 is connected to a particular electrical trace 136 on the upper surface 134 of the PC board 130 through bi-directional lines 176.

Figure 6:
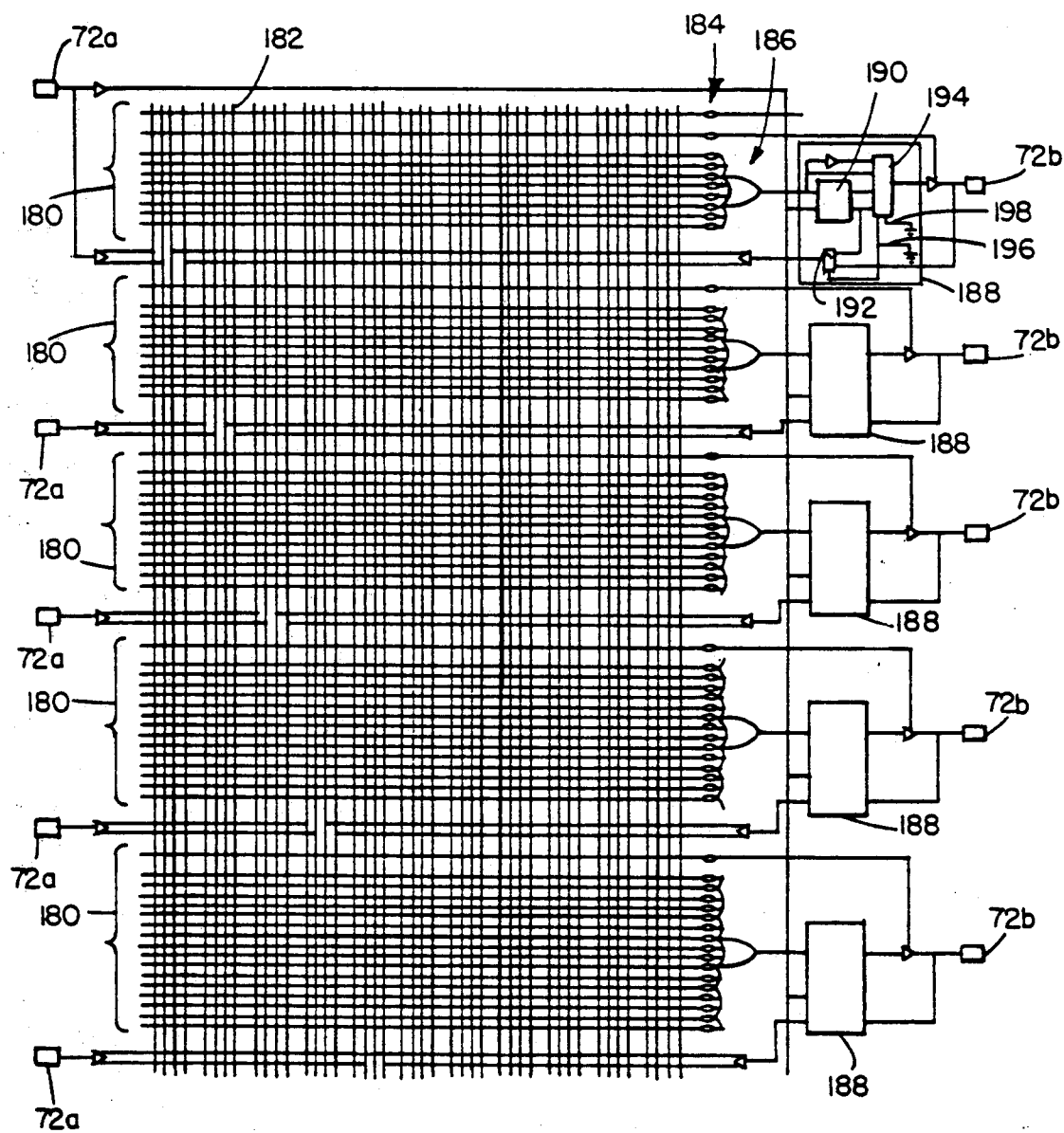
FIG. 6 is a schematic diagram of a portion of an electronic key that can be used with the electronic system shown in FIG. 1.

FIG. 6 is a schematic diagram of a portion of a typical electronic key 42 that can be used with the electronic system shown in FIGS. 1 and 2. The electronic key 42 is a PLD, such as a 22V10 made by Advanced Micro Devices or Lattice Semiconductor. The electronic key 42 has a number of pins 72, including input pins 72a and output pins 72b. The electronic key 42 includes a large number of fuse locations defined by horizontal traces 180 intersecting with vertical traces 182.

A PLD has two modes: a programming (or edit) mode and an operating mode. The PLD is normally in the operating mode. However, it can be caused to enter the programming mode by imposing a high voltage to a particular pin (pin 1 in FIG. 6). In the programming mode, the pins 72 are used as address lines to specify the intersection of a particular horizontal trace 180 and vertical trace 182. After being addressed, the fuse at this intersection can be overloaded and caused to blow by imposing a sufficiently high voltage (or "over-voltage") to another of the pins 72. This disconnects the horizontal and vertical traces 180 and 182.

Through an appropriate pattern of blown fuses (referred to as a "fusemap"), the connections between the input pins 72a and the output pins 72b can be programmed to include logic functions defined by the AND gates 184, the OR gates 186, and the output logic macro cells 188. As shown in the upper right corner of FIG. 6, a typical output logic macro cell 188 includes dynamic elements such as a register 190 and a feedback multiplexer (FMUX) 192 as well as a registered/combinatorial multiplexer (RCMUX) 194. The actual operation of the FMUX 192 and the RCMUX 194 is determined by the state of the internal fuses at locations 196 and 198. These fuses are also part of the fusemap.

The fusemap of the PLD shown in FIG. 6 can be modified (including completely erased) at will by applying appropriate over-voltages to fuse locations at the intersections of the horizontal and vertical traces 180 and 182. The electronic key 42 can alternatively be an electronically-erasable PLD (EEPLD), which allows connections that have been broken (analogously to a blown fuse) to be reconnected. The array of connections in a EEPLD is also referred to as a fusemap. The PLD can be programmed on a PLD programmer 12 as shown in FIGS. 1-5, before it is used to protect electronic system software, to determine its response and to subsequently modify its fusemap.

Figure 7:
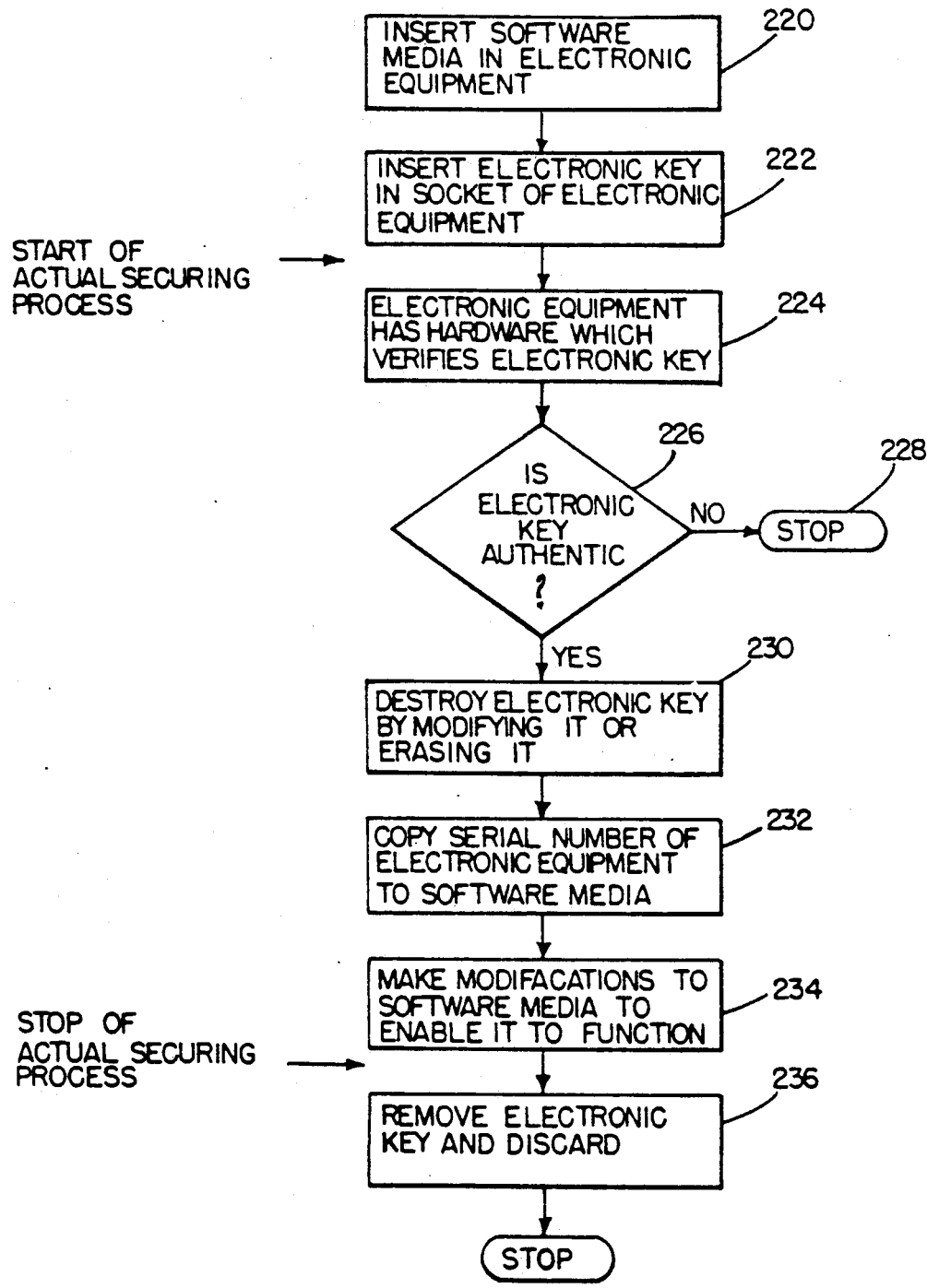
FIG. 7 is a flowchart of the steps in a method for using the electronic system shown in FIG. 1.

FIG. 7 is a flowchart of the steps in a method for protecting software in an electronic system 10 (see FIGS. 1 and 2). Prior to protecting the software, the software medium (such as diskette 26) is inserted into the electronic system 10, for example, by insertion into the diskette drive 24, as shown in block 220. Next, the electronic key 42 is inserted into a contact means 40 (see FIG. 2) of the electronic system 10, as shown in block 222. To begin the process of protecting the software contained on the software medium (diskette 26), the electronic system 10 verifies the electronic key 42 by applying a predetermined sequence of voltage levels to the inputs 72a of the electronic key 42 and observing the resulting output levels at output pins 72b. The resulting output levels are compared to desired output levels to determine whether the electronic key 42 is suitable for use with the software contained on the diskette 26, as shown in block 224. If the electronic system 10 cannot verify the electronic key 42 as suitable by comparing the output levels to the desired output levels, the process of protecting the software is terminated, as in decision block 226 and control point 228. If, on the other hand, the output response levels bear a predetermined relationship to the desired output levels, the electronic key 42 is determined to be authentic, and the process of protecting the software proceeds to block 230 from decision block 226. In the step indicated by block 230, the electronic key 42 is modified or destroyed by changing its fusemap. If the electronic key 42 is a PLD, this is accomplished through an appropriate choice of points in the PLD to which over-voltages are applied. In the next step (block 232) the serial number of the electronic system 10 contained in the electronic component 46 (see FIG. 2) is copied to the software medium (diskette 26). In the final step of the process of protecting the software (block 234), the software medium, which was originally modified to prevent it from functioning, is further modified by the electronic system 10 to enable it to function.

After the method shown in the flow chart of FIG. 7 is successfully applied to the diskette 26, which has now been identified with the particular electronic system 10 on which it was protected (through recording the indicator of the electronic system 10 onto the diskette 26) can only be used with an electronic system 10 having the same indicator as the electronic system 10 on which it was protected. After this point, the electronic key 42 is useless and can be discarded, as shown in block 236. The user of an electronic system 10 which has been used to protect a particular diskette 26 can continue to use that secured diskette or copies thereof, since all copies of the diskette 26 will also be identified with the particular electronic system 10.

While the foregoing has described a particular embodiment of the method and apparatus for protecting software in an electronic system, other modifications will be appreciated by those skilled in the art. Accordingly, the scope of the invention is to be limited only by the following claims.

I claim:

1. Apparatus for protecting software recorded on storage media and adapted for use with an electronic system, at least a portion of said software being recorded on said storage media in a form that is unusable by said electronic system until it is externally modified, said apparatus comprising:

identifying means for storing identifying data specifying at least one specific unit of said electronic system for which use of said software is authorized;

input/output means for reading said software from said storage media and for writing onto said storage media;

an electronic key generating output levels when interrogated by predetermined input levels, said output levels being in a predetermined pattern corresponding to authenticating data recorded on said storage media, the operation of said key being externally modifiable upon receipt of modifying a signal;

interrogating means for interrogating said electronic key with said predetermined input levels and for receiving said output levels; and authentication means operatively connected to said interrogating means, said input/output means, and said identifying means, said authentication means comparing the pattern of the output levels from said interrogating means with said authenticating data and, if said pattern corresponds to said authenticating data, writing said identifying data onto said storage media to identify said storage media with said electronic system, applying said modifying signal to said authenticating means to modify the operation of said key for preventing future use of said key, and modifying the software recorded on said storage media to make said software usable by said electronic system.

2. The apparatus of claim 1 wherein the electronic key is a programmable logic device.

3. The apparatus of claim 1 wherein the modifiable storage media is a diskette.

4. The apparatus of claim 3 wherein the electronic key is a programmable logic device.

5. The apparatus of claim 1 wherein said identifying means is a read-only memory containing a record of the serial number of said electronic system.

6. The apparatus of claim 1 wherein said electronic system is a programmable logic array tester having an electrical socket adapted to receive programmable logic arrays to be tested.

7. The apparatus of claim 6 wherein said key is a programmable logic array, and wherein said interrogating means is connected to said socket so that said socket may be used to receive either said key or said programmable logic array to be tested.

8. Apparatus for programming an integrated circuit with data according to a private algorithm, comprising:

means for receiving the integrated circuit;

means for storing an indicator that is distinctive for the programming apparatus;

means for reading from readable storage media;

an electronic key including electronic elements and having inputs and outputs connected thereto, the electronic elements being programmed according to a modifiable fusemap to produce predetermined response levels at its outputs in response to predetermined levels at its inputs;

modifiable storage media associated with the electronic key for storing said data and said algorithm, at least a portion of the storage media being unreadable by the storage media reading means if an indicator in the storage media is not a predetermined function of the indicator that is distinctive for the programming apparatus;

means for applying a predetermined set of test levels to the inputs of the electronic key and for receiving the corresponding output levels of the electronic key;

means for comparing the output levels of the electronic key to a predetermined set of response levels;

means for signifying that the output levels are properly matched with the predetermined set of response levels;

means for transferring the distinctive indicator from the programming apparatus to the storage media, thereby identifying the storage media with the programming apparatus; and means for modifying the fusemap to prevent continued use of said key.

9. The apparatus of claim 8 wherein the electronic key is a programmable logic device.

10. The apparatus of claim 8 wherein the modifiable storage media is a diskette.

11. The apparatus of claim 10 wherein the electronic key is a programmable logic device.

12. Apparatus for programming an integrated circuit with data according to a private algorithm, comprising:

means for receiving the integrated circuit;

means for storing an indicator that is distinctive for the programming apparatus;

means for reading from readable storage media;

a electronic key including electronic elements and having inputs and outputs connected thereto, the electronic elements being programmed according to a modifiable fusemap to produce predetermined response vectors at its outputs in response to predetermined vectors at its inputs;

modifiable storage media associated with the electronic key for storing said data and said algorithm, said storage media being removable from the programming apparatus, at least a portion of the storage media being unreadable by the storage media reading means if an indicator in the storage media is not a predetermined function of the indicator that is distinctive for the programming apparatus;

means for applying a predetermined set of test vectors to the inputs of the electronic key and for receiving the corresponding output vectors of the electronic key;

means for comparing the output vectors of the electronic key to a predetermined set of response vectors;

means for signifying that the output vectors are properly matched with the predetermined set of response vectors;

means for transferring the distinctive indicator from the programming apparatus to the storage media, thereby identifying the storage media with the programming apparatus; and means for modifying the fusemap to prevent continued use of said key.

13. The apparatus of claim 12 wherein the electronic key is a programmable logic device.

14. The apparatus of claim 12 wherein the modifiable storage media is a diskette.

15. The apparatus of claim 14 wherein the electronic key is a programmable logic device.

16. A method for protecting software recorded on storage media and adapted for use with an electronic system, at least a portion of said software being recorded on said storage media in a form that is unusable by said electronic system until it is externally modified, said storage media further recording predetermined authenticating data, said method comprising:

storing an indicator in said electronic system that is specific to said electronic system;

providing an electronic key which contains information corresponding to said authenticating data recorded on said storage media, the information in said key being externally modifiable;

interrogating said electronic key to determine said information; and comparing the information from said key with said authenticating data and, if said information corresponds to said authenticating data, recording said identifying data onto said storage media to identify said storage media with said electronic system, modifying the operation of said key for preventing future use of said key, and modifying the software recorded on said storage media to make said software usable by said electronic system.

17. The method of claim 16 wherein said electronic key is interrogated by applying a predetermined set of test levels to the electronic key and receiving the corresponding output levels of the electronic key.

* * * * *